Figure 1:
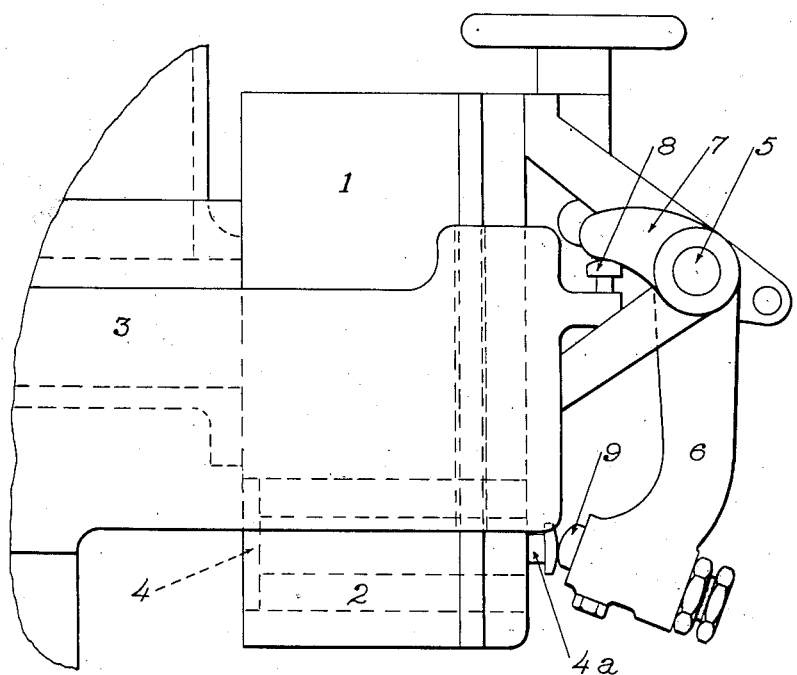

Nov. 20, 1934.   F. G. RICKER   1,981,151

ACTUATING MECHANISM FOR DOUGH DIVIDERS

Filed Nov. 23, 1933

INVENTOR
FREDERICK G. RICKER
George B. Willcox
ATTORNEY

Patented Nov. 20, 1934

1,981,151

UNITED STATES PATENT OFFICE 1,981,151

ACTUATING MECHANISM FOR DOUGH DIVIDERS

Frederick G. Ricker, Saginaw, Mich., assignor to Baker Perkins Company, Inc., Saginaw, Mich., a corporation of New York Application November 23, 1933, Serial No. 699,382

2 Claims. (Cl. 107—15)

This invention relates to machines for dividing measured pieces of dough or other plastic materials of the kind which has a dividing head with a plurality of measuring pockets arranged side by side and ejecting pistons therein. It has to do more particularly with the reciprocatory piston-actuating members of known type, having each an abutment member which engages the pistons, or push rods integral with the pistons, and which are actuated in one direction to push the pistons through their measuring pockets to eject the dough pieces therefrom. On the reverse stroke of the pistons, as they are displaced by dough forced into the measuring pockets from the usual compression chamber, the actuating members are moved rearwardly until their motion is arrested by an adjustable stop. This stop thus limits the rearward motion of the pistons, and its position governs the volume of dough received by the pockets.

A common difficulty in dough dividers of this general type has been that dough pieces of uneven weight have been produced by different pockets of the same machine, due to variations in the density of the dough in different parts of the compression chamber. As a rule denser charges of dough are received in the outside pockets than in the pockets between. In order to compensate for the resulting difference in the weight of dough pieces of identical volume, it has been necessary to provide means for adjusting the individual positions of the abutment members on the actuating arms axially of the pistons so that the pistons in the several pockets could be stopped in different positions at the conclusion of their backward travel. Heretofore means for making such adjustments have been provided at the abutment member of the piston actuating arm, or in the piston rod. For example, the actuating members for the intermediate pistons of a multiple pocket divider would be adjusted outwardly away from their pistons so that as they were displaced by incoming dough they could travel further than the outside pistons, and slightly larger loaves of the less dense dough would be received in the intermediate pockets.

This means for adjusting the volume of the individual pockets was subject to certain new operating difficulties. Since all of the piston actuating members of the usual dough divider are operated by a common actuating means, the pistons are driven through equal working strokes. Adjusting some of the abutments or piston rods so that their associated pistons would be pushed back in their pockets farther than the other pistons of the same machine had the result that on the discharging stroke of the piston actuating means, those pistons which had traveled farther back would not be pushed clear to the mouths of their pockets, flush with the face of the dividing head. Therefore, a thin layer of dough would lie within the recessed mouth of the pocket at the conclusion of each stroke. Occasionally, when the dividing head moved out of register with the compression chamber to its discharging position, this layer of dough would adhere to the piston and be sheared off from the body of the dough piece, with the result that the loaf would be short-weight.

The object of my invention is to overcome the difficulties described by providing means to effect individual adjustment of the volume of the measuring pockets which will permit the pistons to travel rearwardly in their pockets to varying distances and yet on the ejecting strokes will cause all of the pistons to be moved clear to the mouths of their pistons flush with the face of the dividing head.

The invention by which I accomplish this purpose consists of a piston abutment member, yieldingly mounted in the actuating member, and adjustably limited in the extent to which it can yield, so that under dough pressure the piston can travel back a variable distance, displacing the yieldable abutment until it is brought to rest by a stop operatively associated with the actuating member. This stop is interposed between the yieldable abutment and the actuating member and is adjustable in position to permit varying the displacement of an individual measuring pocket by permitting the piston to be moved a variable distance by incoming dough, after the actuating member and its associated mechanism have been brought to rest. On the following discharge stroke of the actuating member the yieldable abutment will by its released compression propel the associated piston to the end of its measuring pocket, after the ejecting travel of the actuating member has ceased.

A preferred structure has been chosen for illustration, and the invention will be described accordingly.

Referring to the drawing, Fig. 1 is a side elevation of the reciprocatory measuring head of a multiple-pocket dough divider, showing the piston-actuating mechanism and the invention applied thereto.

Figure 2:
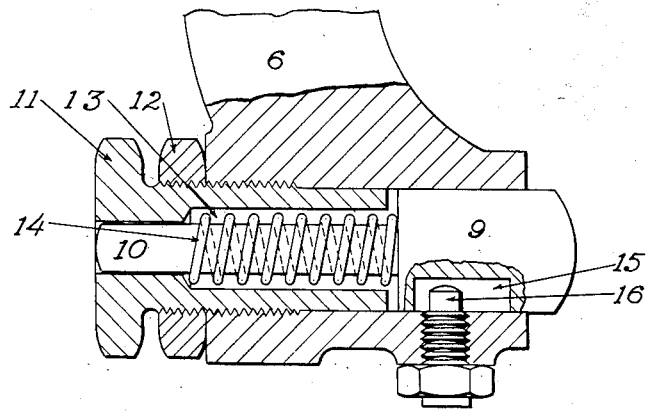

Fig. 2 is an enlarged sectional side elevation of the invention, showing the details of its construction.

In Fig. 1 the dividing head is mounted for vertical reciprocation and is provided with a plurality of measuring pockets 2 arranged side by side, in known manner. The head 1 is shown in its lowered position, when dough pieces are discharged from the pockets 2. In its uppermost position (not indicated) the pockets 2 are brought into register with the mouth of a compression chamber 3 to receive charges of dough therefrom.

The customary ejecting pistons 4, including the piston rods 4a, are slidable in the pockets 2. Carried by and movable with the head 1 is a rockshaft 5 having a plurality of piston actuating members or arms 6, one for each piston. An arm 7 is also fixed to the shaft 5 and is positioned for engagement with a stationary stop 8 fixed to the frame of the machine. During the downward movement of the dividing head 1 to its discharging position arm 7 engages stop 8, rocking the shaft and the piston actuating member 6 in a clockwise direction as viewed in Fig. 1.

Each member 6 at its lower end is provided with an abutment 9 positioned to engage the piston rod 4a of piston 4. The abutment 9, cylindrical in form, is slidably received in a cylindrical bore in the lower end of arm 6 and has an integral axial extension 10 of reduced diameter projecting from its rear. A tubular gland 11 is screwthreaded into the bore of member 6 and a locknut 12 is provided for locking the gland in any position to which it may be screwed. In a cylindrical recess 13, larger in diameter than the extension 10 of the abutment, is space for a compression spring 14 which bears at one end against the rear face of abutment 9 and at its other end against the face of the gland 11 at the end of the enlarged recess 13. The abutment 9 is provided with an elongated slot 15 in which is received a cylindrical pin 16 screw-threaded in member 6. The pin 16 serves to limit endwise motion of the abutment 9 with respect to member 6 and it also serves to hold the abutment 9 against rotation, as when adjustment of the gland 11 is being made.

The lengths of the abutment 9 and of the gland 11 are such that normally the spring 14 will maintain a clearance between their adjacent ends.

The operation of the described invention is as follows: When it is found that certain of the pockets of the dough divider, generally the outside pockets, are discharging heavier dough pieces than the others, the glands 11 in the actuating arms 6 for those pockets which are discharging the lighter pieces, i. e., the intermediate pockets, are screwed rearwardly, away from abutments 9.

This permits the piston in those pockets to be pushed back farther before abutment 9 is stopped against gland 11, so that those pockets which are receiving the lighter dough will contain dough pieces of larger volume to compensate for the greater density of the pieces in the outside pocket.

The machine then is operated in the usual manner. That is, after discharging dough pieces from the pockets, the measuring head 1, together with the rock-shaft 5 and the piston actuating members 6, is moved upward from its position in Fig. 1 until the measuring pockets 2 are in register with the compression chamber 3. The charge of dough is forced from the compression chamber into the pockets and the pistons 4 and rods 4a are thereby pushed backward against the abutment 9, rocking the member and the rock-shaft counter-clockwise until an arm on the rock-shaft, not shown, encounters a stationary stop which has been adjusted so that the measuring pockets will hold the desired predetermined amount of dough. The compression of the dough in chamber 3 continues, and this pressure urges the pistons rearwardly in the pockets. Where the gland 11 has been backed off as described, the associated abutment 9 yields, compressing the spring 13 until the abutment comes into contact with the end of the gland 11, when motion of the associated piston is arrested. The dividing head 1 is then moved down toward its position of Fig. 1, shearing off the dough in the pockets 2 from the mass in the compression chamber 3. The arm 7 encounters the stop 8 and rocks shaft 5 clockwise so that members 6 and abutments 9 move their pistons to the left to discharge the dough pieces from the measuring pockets.

As regards the pistons associated with those members 6 in which the glands 11 have been adjusted rearwardly, those pistons will be pushed farther back into the pockets against springs 14. On the discharge stroke the piston 4 will be moved by the impulse of the arm 6 to a point short of the working face of the measuring head to the extent that the gland 11 has been adjusted rearwardly. The release of the pressure on spring 14 will cause the compressed spring to move abutment 9 and the piston the rest of the distance toward the mouth of the pocket so that the piston is brought flush with the face of the measuring head.

In dough dividers previously constructed, adjustment of the unyielding abutments on the actuating arms or of the length of the piston rods for the purpose of permitting the associated pockets to receive larger dough pieces was unsatisfactory. This was occasioned by the fact that the actuating mechanism had a fixed stroke, so that where such adjustment was effected the piston would not be moved clear to the mouth of those measuring pockets. This left a small recess in which dough could cling, to be sheared off from the principal body of the dough piece when the dividing head moved upward. Thus occasionally dough would stick to the face of the piston, a thin layer would be sheared off, and the dough piece to which it belonged would be short in weight.

The invention permits the individual adjustment of the strokes of the measuring pistons, sufficient to compensate for variations in density of different parts of the dough mass without disturbing the normal operation of the machine. That is, the pistons of all pockets will finish their discharge strokes flush with the mouths of their pockets irrespective of differences in their extreme rearward positions.

Another advantage of my invention is that the adjustable yieldable abutments are applicable to a dough divider using standard piston and piston rod assemblies having no provision for changing the length of the rod, and which are, therefore, economical and convenient to replace. Replacement of a damaged piston can be effected in a moment without disturbing the nice individual adjustment of the piston's stroke, since the gland 11 and the lock-nut 12 of the abutment assembly need not be disturbed.

Where the means for adjusting the length of the piston rod 4a has been incorporated in the piston assembly the replacement of a damaged piston was more expensive, due to the more complex piston assembly, and necessitated a very much longer shut-down of the machine for changing the piston and readjusting the new pistons and rods.

While the invention has been illustrated and described as applied to a divider having a vertically reciprocable head, it is equally suited to use with machines having rotary-type dividing heads. Various departures from the particular construction of the yieldable, adjustable abutment member described herein may obviously also be made without departing from the essential principles of the invention.

Having thus described my invention, what I claim and desire to secure by Letters Patent is:

1. In a machine for dividing dough and the like plastic materials into measured pieces, having a dividing head with a plurality of measuring pockets, an ejecting piston slidable in each of said pockets, and actuating members for said pistons operable to move the pistons to the mouths of their pockets to expel dough pieces therefrom and to limit the reverse travel of said pistons, in combination, an abutment member interposed between one of said actuating members and its associated piston and yieldably mounted in said actuating member, and an adjustable stop to limit the yielding motion of said abutment member relative to said actuating member.

2. In a dough divider having a reciprocatory dividing head and a plurality of measuring pockets, an ejecting piston in said pockets and a rocker arm for each of said pistons operable in one direction to move the pistons toward the mouths of their pockets to eject dough pieces therefrom and to limit the reverse travel of the pistons, in combination, an abutment interposed between one of said arms and its associated piston, said abutment slidably mounted in said actuating arm, and spring means adapted to urge said abutment and piston away from said actuating arm and an adjustable stop for limiting the yielding motion of said abutment relative to said arm against said spring means.

FREDERICK G. RICKER.